UNITED STATES PATENT OFFICE.

SIGISMUND BEER, OF NEW YORK, N. Y., ASSIGNOR TO LEWIS FEUCHTWANGER AND SIGISMUND BEER.

IMPROVEMENT IN DEVULCANIZING INDIA-RUBBER.

Specification forming part of Letters Patent No. 12,983, dated May 29, 1855.

*To all whom it may concern:*

Be it known that I, SIGISMUND BEER, of the city, county, and State of New York, have invented a new and Improved Method of Devulcanizing Caoutchouc, Gutta-Percha, and Similar Gums; and I do hereby declare that the following is a full, clear, and exact description thereof—that is to say:

My invention consists in a process for treating india-rubber and gutta-percha or their compounds after those have been cured or vulcanized with sulphur, that treatment having for its object the restoring of the said gums to a condition or state whereby they may be again worked, either as a substitute for the original or native material or in combination or mixture with it. I call said treatment "devulcanization," because it effects a change in the state of cohesion existing in the vulcanized gum to another state nearly, if not quite, identical with that of the original or native material.

The operation is as follows: In the first place I take the vulcanized gum and grind it between rollers into small pieces or to powder. The sulphur may now be extracted by the application of several chemical agents, as alkaline lyes, soap, and mixtures of alkalies with essential or fixed oils, grease, rosin, naphtha, bisulphuret of carbon, ether, &c. I prefer first to boil the ground rubber in an alkaline lye, and afterward to give it a second boiling in alkaline solution, to which is added spirits of turpentine. This latter facilitates the operation by causing the gum to soften and swell, and thus allow the alkali to act more energetically in dissolving the sulphur. This process is to be continued for a greater or less time and the operation to be repeated until the sulphur is fully extracted. The rubber is then washed, pressed, and dried, when it will be ready for the second or devulcanizing process.

In the manufacture of rubber it is often adulterated with many other substances—such as chalk, white lead, metals, oxides, &c. If it is desirable to separate these also, (although this is not essential,) the rubber may be treated with acetic or pyroligneous acid or other chemical agents, all of which are well known, and to give clearness and transparency to the gum it may still further be treated in solutions of cyanide of potassium, hypochloride of lime, or other like deoxidizing substance.

To devulcanize or change the state of cohesion is effected by means of certain substances, which are known to be solvents of the native gums in connection with the employment of heat. Some of the materials I have found applicable are spirits of turpentine, naphtha, bicarburet of sulphur, and any essential or fixed oils, or by combinations of such substances, or with others, as a mixture of turpentine and alcohol or ether. I prefer to employ the spirits of turpentine as the principal material, as being the most economical and readily obtained. This I apply in one of two ways, according as I wish to obtain a compact and solid or a softer and more liquid product. For the former I submit the gum to the vapors of turpentine in a suitable vessel for a certain length of time, which may vary according to circumstances—as, for instance, if the gum has been more or less purified in the preliminary preparation the time of treatment will be more or less prolonged. This can in all cases be ascertained by experimenting with small pieces of the gum taken out from time to time and kneading them in the fingers, when, as soon as it appears compact and elastic, the process is completed. The gum is then taken out of the vaporing vessel and dried, when it is fit for use, as before stated. To perform the operation with the least expenditure of turpentine the vapors may be collected and condensed in a still in a manner well known.

When the gum is required to be obtained in a softer state, it is to be immersed in the turpentine, and subjected to heat as before, until by trial it is found to have the necessary cohesion and elasticity. When this latter process is employed it is proper, in order to prevent the mass from being "tacky," to introduce alcohol or a small quantity of sulphur into the solution.

Having thus described the nature of my discovery and invention, I do not limit myself precisely to the ingredients or process named, as the same is undoubtedly susceptible of considerable variation without in the least changing the character of the invention or the results produced thereby.

I claim therefore—

The restoration of caoutchouc, gutta-percha, or other similar gums which have undergone the process of being cured or vulcanized, so that those gums may be capable of being used again as a substitute for native gums of like character, or in combination with such gums, by first treating the vulcanized gum with alkalies or compounds of alkalies and oils, as potash with any common grease or oil, for extracting the sulphur, &c., and then submitting the mass to the action of heat and turpentine or any other liquid known to be a solvent of the gum in its natural condition, as herein described.

SIGISMUND BEER.

Witnesses:
J. P. PIRSSON,
S. H. MAYNARD.